(12) United States Patent
Yamada (10) Patent No.: US 8,149,328 B2
(45) Date of Patent: Apr. 3, 2012

(54) SHOULDER PAD, PAD UNIT, AND VIDEO CAMERA

(75) Inventor: Junya Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 445 days.

(21) Appl. No.: 12/418,833

(22) Filed: Apr. 6, 2009

(65) Prior Publication Data

US 2009/0251593 A1 Oct. 8, 2009

(30) Foreign Application Priority Data

Apr. 8, 2008 (JP) .................................. 2008-099896

(51) Int. Cl.
*H04N 5/225* (2006.01)
*A45F 3/14* (2006.01)

(52) U.S. Cl. ...................................... 348/376; 224/265

(58) Field of Classification Search .................. 348/373, 348/376; 224/265, 270, 271
See application file for complete search history.

(56) References Cited

U.S. PATENT DOCUMENTS

| 4,037,763 | A | * | 7/1977 | Turchen | 224/153 |
| 4,091,975 | A | * | 5/1978 | Russell, Jr. | 224/265 |
| 4,389,675 | A | * | 6/1983 | Suzuki et al. | 348/376 |
| 2003/0173383 | A1 | * | 9/2003 | Greene | 224/265 |
| 2009/0180135 | A1 | * | 7/2009 | Hsu | 358/1.15 |

FOREIGN PATENT DOCUMENTS

| JP | 2000-217020 | | 8/2000 |
| JP | 2006-129146 | * | 10/2004 |

* cited by examiner

*Primary Examiner* — Trung Diep
(74) *Attorney, Agent, or Firm* — Wenderoth, Lind & Ponack, L.L.P.

(57) ABSTRACT

A pad main body of a shoulder pad includes an elastic pad part comprising two side walls provided to face each other, and a bottom wall provided between these side walls to form a U-shape along with the side walls; and a rib provided on the inside of the U shape of the pad part, from one of the two side walls to the other.

15 Claims, 8 Drawing Sheets

SHOULDER PAD, PAD UNIT, AND VIDEO CAMERA

CROSS-REFERENCE TO RELATED APPLICATIONS

This application claims priority under 35 U.S.C. §119 to Japanese Patent Application No. 2008-099896 filed on Apr. 8, 2008. The entire disclosure of Japanese Patent Application No. 2008-099896 is hereby incorporated herein by reference.

BACKGROUND

1. Technical Field

The technical field is related to shoulder pads and the like.

2. Description of the Related Art

In the past, shoulder pads have been provided to shoulder-carried video cameras and other such devices. For instance, Patent Document 1 (Japanese Laid-Open Patent Application 2000-217020) discloses the shoulder pad 100 shown in FIG. 8.

Figure 8:
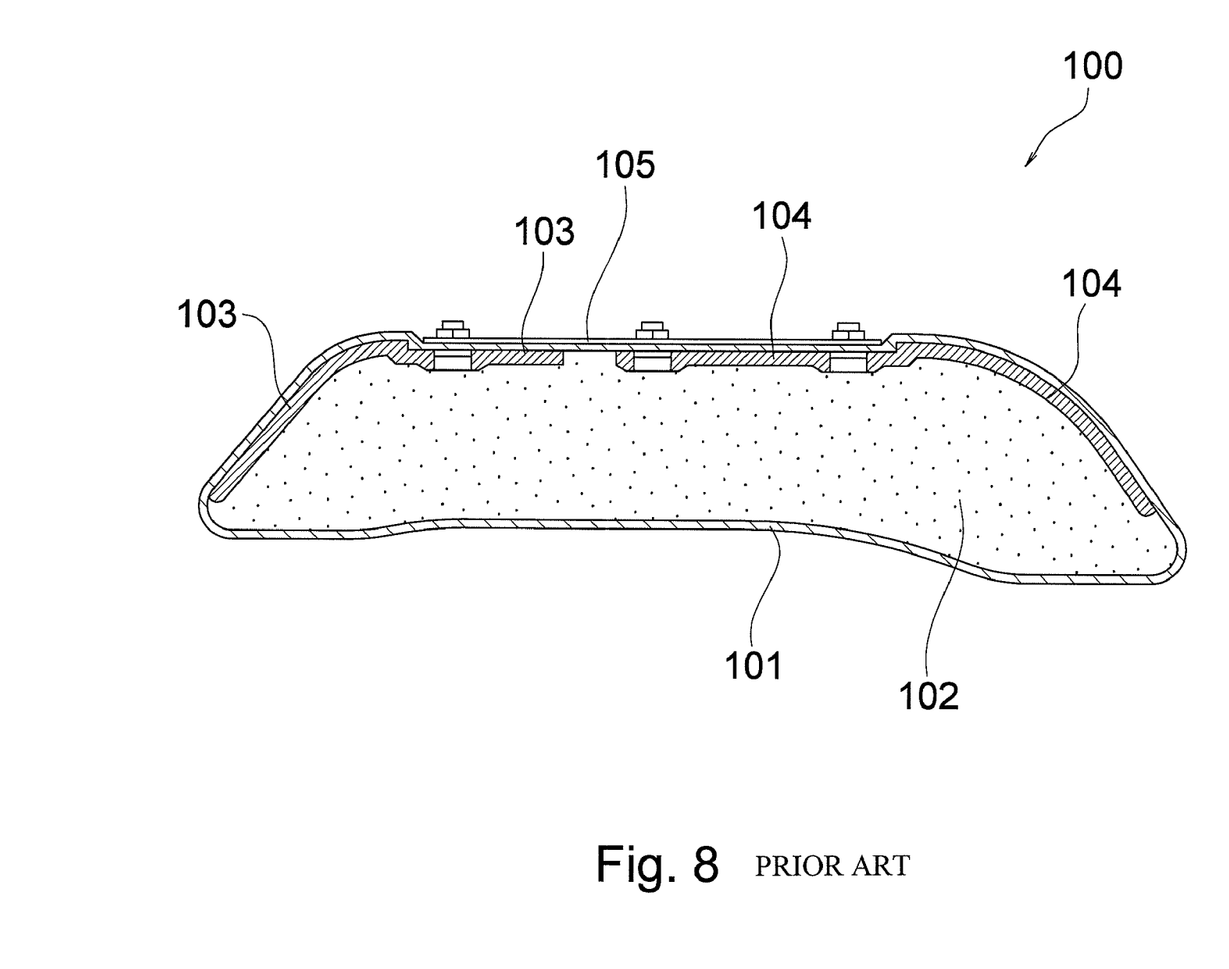
FIG. 8 is a cross section of a conventional shoulder pad.

As shown in FIG. 8, the shoulder pad 100 includes an outer covering 101, a fluid body 102, lower plates 103 and 104, and an upper plate 105.

The outer covering 101 is a pouch-shaped member that constitutes the outer skin of the shoulder pad 100, and is made from soft vinyl chloride, a rubber material, or synthetic leather.

The fluid body 102 is a plastic material, carbon or another such powder, or silicone oil, a lipid or another such gel. The outer covering 101 is filled with the fluid body 102.

The lower plates 103 and 104 are disposed inside the outer covering 101 by being inserted into the outer covering 101 through an opening (not shown) made in the outer covering 101.

The upper plate 105 is fixed with screws to the lower plates 103 and 104. That is, the outer covering 101 is sandwiched between the upper plate 105 and the lower plate 103, and between the upper plate 105 and the lower plate 104. When the upper plate 105 is fixed with screws to the video camera main body (not shown), this fixes the shoulder pad 100 to the video camera main body.

The fluid body 102 is necessary with the above-mentioned conventional shoulder pad in order to obtain the desired cushioning. Consequently, more parts are required and the manufacturing process tends to be more complicated, which is a problem in that the manufacturing cost is higher.

SUMMARY

A technology described below provides a pad, a shoulder pad, a video camera, etc., with which manufacturing costs can be reduced.

A pad according to an aspect includes an elastic pad part comprising a first side wall, a second side wall provided to face the first side wall, and a bottom wall provided between the side walls to form a U-shape along with the side walls; and at least one rib provided on the inside of the U shape of the pad part, from the first side wall to the second side wall.

In specific terms, this pad can be used as a shoulder pad, and more specifically it can be used in video cameras and various other such devices.

With the pad, the cushioning property of the pad is obtained by the pad part and the rib provided inside this part. Accordingly, there is no need to fill the inside of the pad with fluid body, and manufacturing costs can be reduced.

BRIEF DESCRIPTION OF DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

I. First Embodiment

I-1. Video Camera Structure

Figure 1:
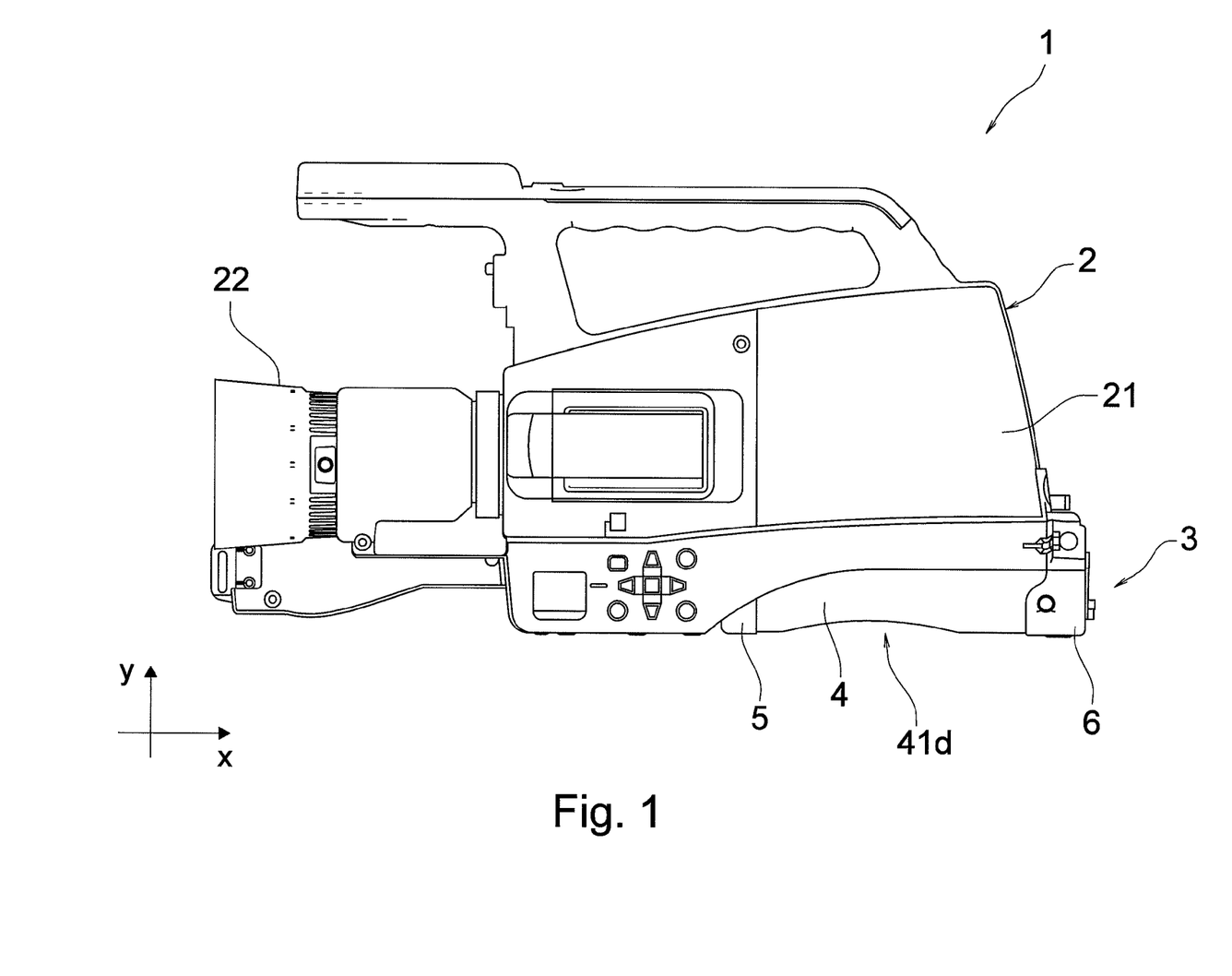
FIG. 1 is a side view of a video camera in accordance with a first embodiment of the present application.

As shown in FIG. 1, the video camera 1 includes a camera main body 2 (an example of the main body device) and a shoulder pad 3.

The camera main body 2 includes a main body casing 21 and a lens unit 22 mounted on the main body casing 21. Various members (not shown) are built into the main body casing 21, such as an imaging element disposed to receive light through the lens inside the lens unit 22, a memory to store captured image data, a battery, and a controller.

The shoulder pad 3 is disposed on the lower face of the main body casing 21. The shoulder pad 3 includes a pad main body 4, a front support member 5 (an example of the fixing part), and a rear support member 6 (an example of the fixing part).

In this Specification, the terms used to indicate direction, such as forward and backward, up and down and left and right, refer to directions as viewed by the user of the video camera 1. Specifically, "forward" refers to the direction in which the lens of the video camera 1 faces (that is, to the left in FIG. 1), "backward" refers to the opposite direction (that is, to the right in FIG. 1), "up" refers to the upward direction in FIG. 1 and "down" to the downward direction in FIG. 1, and "right" refers to the direction away from the viewer of FIG. 1 and "left" to the direction toward the viewer of FIG. 1. For the sake of convenience, the forward and backward direction, up and down direction, and left and right direction in the drawings are referred to as the x, y, and z axes.

Figure 2:
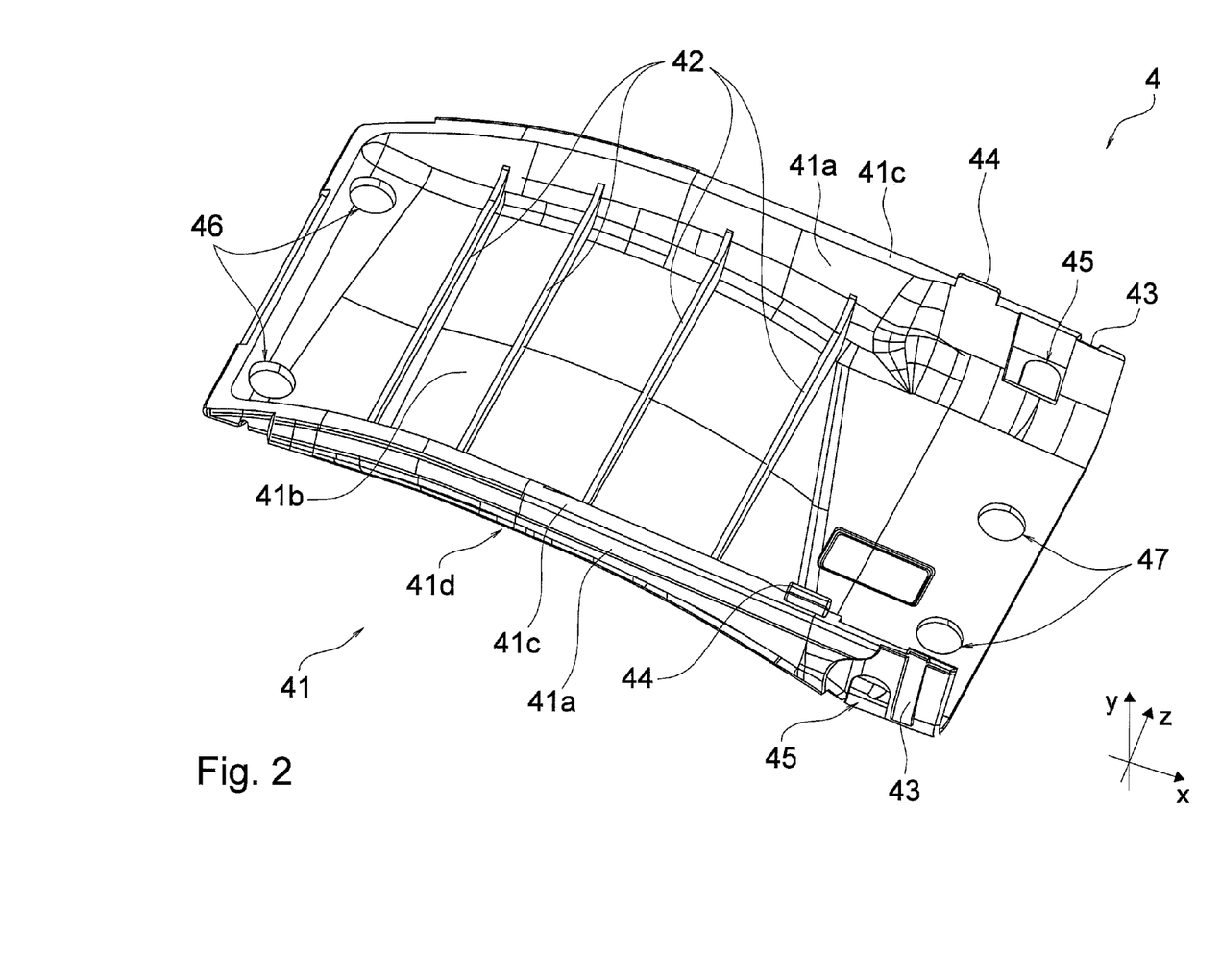
FIG. 2 is a perspective view of a pad main body.

As shown in FIG. 2, the pad main body 4 (an example of the pad) includes a pad part 41 and ribs 42. The pad main body 4 is formed entirely from a single elastic member. This elastic member may be a rubber material, and elastomer, or any other material with elasticity. The pad main body 4 can be manufactured by a standard injection molding.

Figure 6:
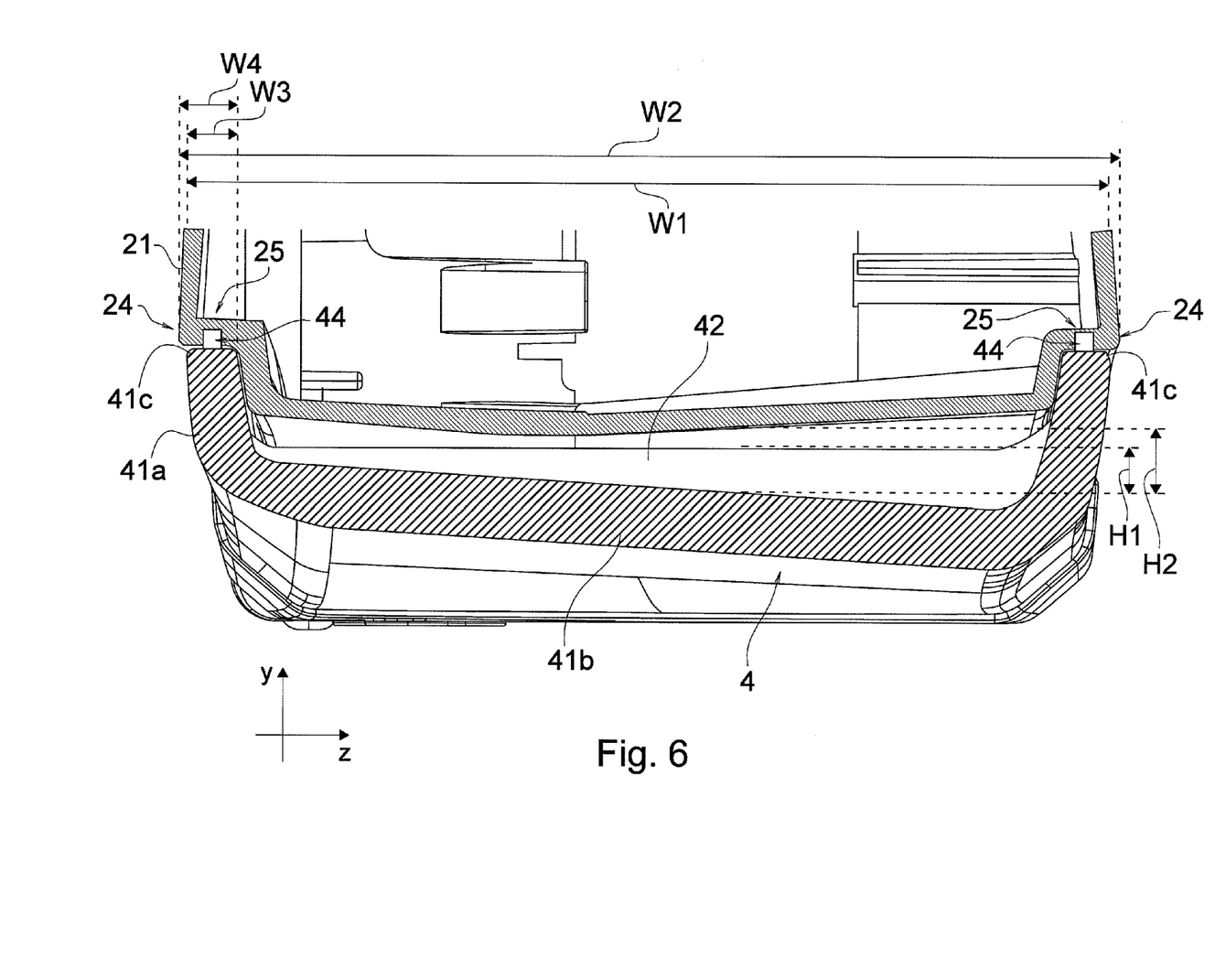
FIG. 6 is a cross section of the lower part of a video camera in the y-z plane.

As shown in FIG. 1 and elsewhere, the pad part 41 has a shape that extends longer in one direction, and is disposed so that its lengthwise direction matches the forward and backward direction of the video camera 1 (the x axis direction). As shown in FIG. 2 and FIG. 6, the pad part 41 is formed in a U shape in a cross section along the y-z plane perpendicular to the lengthwise direction of the part. That is, the pad part 41 includes two side walls 41a and a bottom wall 41b provided between the two side walls 41a.

As shown in FIG. 2, a groove 43 is provided near the rear end of each of the side walls 41a. The grooves 43 are provided to the outer faces of the side walls 41a, and are longer in the up and down direction (the y axis direction).

Also, as shown in FIG. 2, a protrusion 44 is provided to each edge of the U shape of the pad part 41, that is, to the upper ends 41c of the side walls 41a. The protrusions 44 are disposed more to the front than the grooves 43 near the rear ends of the side walls 41a, and protrude upward from the upper ends 41c.

Also, as shown in FIG. 2, an opening 45 is provided to each of the side walls 41a. The openings 45 are disposed between the grooves 43 and the protrusions 44.

As shown in FIG. 2, two openings 46 aligned in the left and right direction are provided near the front end of the bottom wall 41b, and two openings 47 aligned in the left and right direction are provided near the rear end of the bottom wall 41b.

As shown in FIGS. 1 and 2 and elsewhere, the bottom face of the bottom wall 41b is curved upward. In other words, an indentation 41d that is recessed in a gentle curve in a cross section along the x-y plane is formed in the bottom face of the bottom wall 41b, in the approximate center portion in the forward and backward direction of the pad part 41. The indentation 41d is provided to traverse the pad part 41 in the left and right direction. That is, the indentation 41d is provided to be contiguous from one end of the pad part 41 to the other in the z axis direction. The indentation 41d is the portion of the video camera 1 that rests on the shoulder of the user, and its curve is designed to conform to the shape of a shoulder. The above-mentioned protrusions 44 are disposed to the rear of the indentation 41d, and the openings 46 are disposed ahead of the indentation 41d.

The ribs 42 are provided on the inside of the U shape of the pad part 41, from one of the side walls 41a to the other. That is, the ribs 42 are formed to be contiguous from the inner face of one side wall 41 to the inner face of the other side wall 41a. More specifically, as shown in FIG. 2, the ribs 42 are formed on the inside of the bottom wall 41b and parallel to the y-z plane. As shown in FIG. 2, in this embodiment four of the ribs 42 are disposed substantially equidistantly in the x axis direction. However, the shape, number, and spacing of the ribs 42 are not limited to this.

Figure 3:
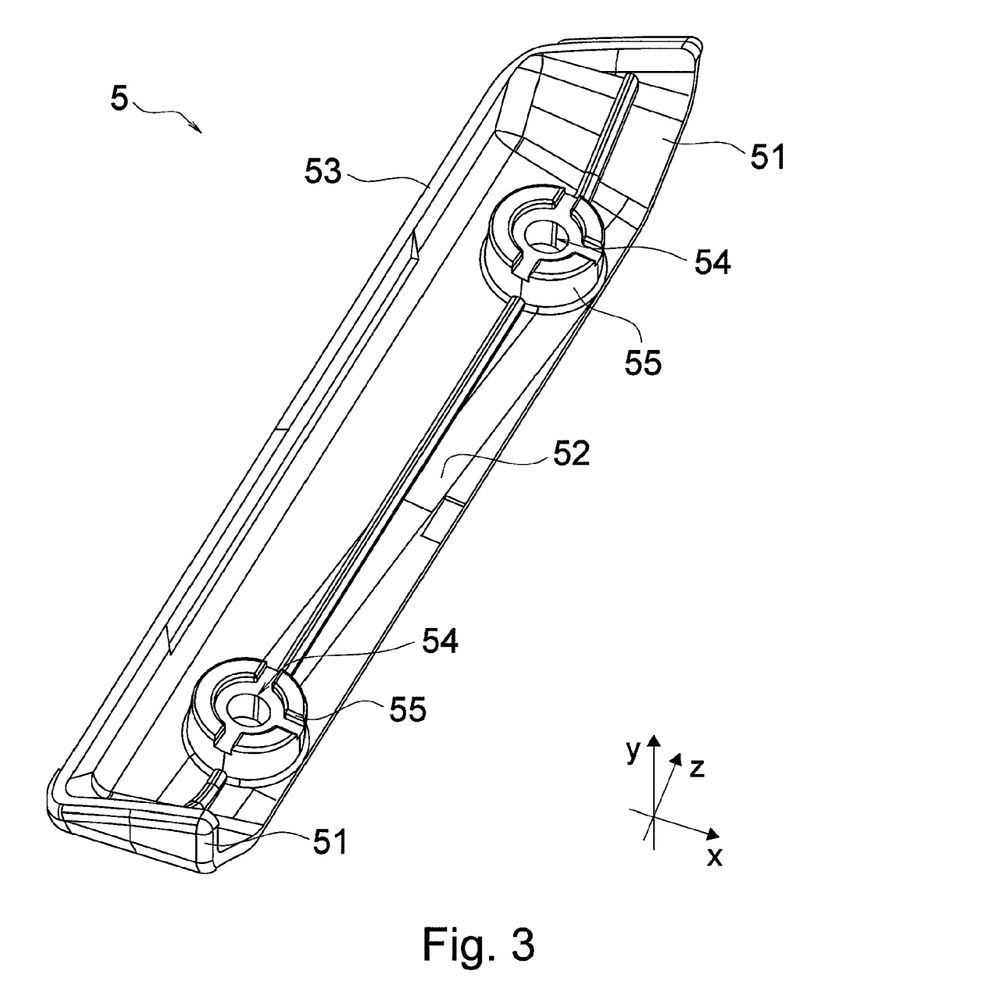
FIG. 3 is a perspective view of a front support member.
Figure 4:
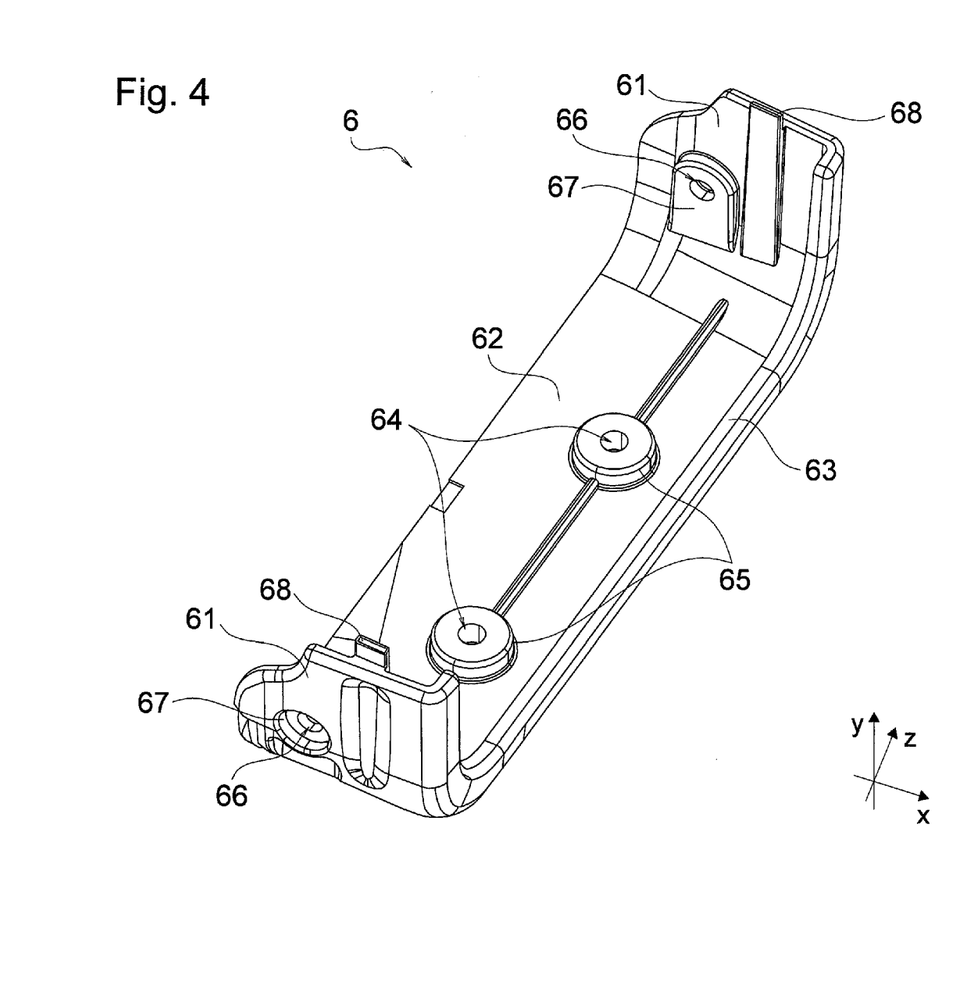
FIG. 4 is a perspective view of a rear support member.

As shown in FIGS. 3 and 4, the front support member 5 is formed so that its inner face conforms to the outer face of the front end of the pad part 41. That is, the front support member 5 includes two side walls 51 and a bottom wall 52 provided between the two side walls 51. A cross section of the front support member 5 in the y-z plane has a U shape formed by the two side walls 51 and the bottom wall 52. The front support member 5 further includes a front wall 53 that is substantially rectangular. The front wall 53 is surrounded on three sides by the two side walls 51 and the bottom wall 52.

Bosses 55 each having a screw hole 54 are provided to the bottom wall 52 of the front support member 5. The bosses 55 are formed so that their height is equal to the thickness of the front end of the bottom wall 41b of the pad part, and particularly the thickness around the openings 46.

The front support member 5 is made of plastic, and can be molded with a standard injection molding.

As shown in FIG. 4, the rear support member 6 is formed so that its inner face conforms to the outer face of the rear end of the pad part 41. That is, the rear support member 6 includes two side walls 61 and a bottom wall 62 provided between the two side walls 61. A cross section of the rear support member 6 in the y-z plane has a U shape formed by the two side walls 61 and the bottom wall 62. The rear support member 6 further comprises a rear wall 63. The rear wall 63 is surrounded on three sides by the two side walls 61 and the bottom wall 62.

Bosses 65 each having a screw hole 64 are provided to the bottom wall 62 of the rear support member 6. The bosses 65 are formed so that their height is equal to the thickness of the rear end part of the bottom wall 41b of the pad part 41, and particularly the thickness around the openings 47.

Also, bosses 67 each having a screw hole 66 are provided to the side walls 61 of the rear support member 6. The bosses 67 are formed so that their height is equal to the thickness of the rear end part of the side walls 41a of the pad part 41, and particularly the thickness around the openings 46.

Protrusions 68 are provided to the side walls 61. The protrusions 68 are provided on the inner faces of the side walls 61, are longer in the up and down direction (the y axis direction), and have a shape that protrudes to the inside of the rear support member 6. The upper ends of the protrusions 68 protrude higher than the upper ends of the side walls 61.

Just like the front support member 5, the rear support member 6 is made of plastic, and can be molded with a standard injection molding.

Figure 5:
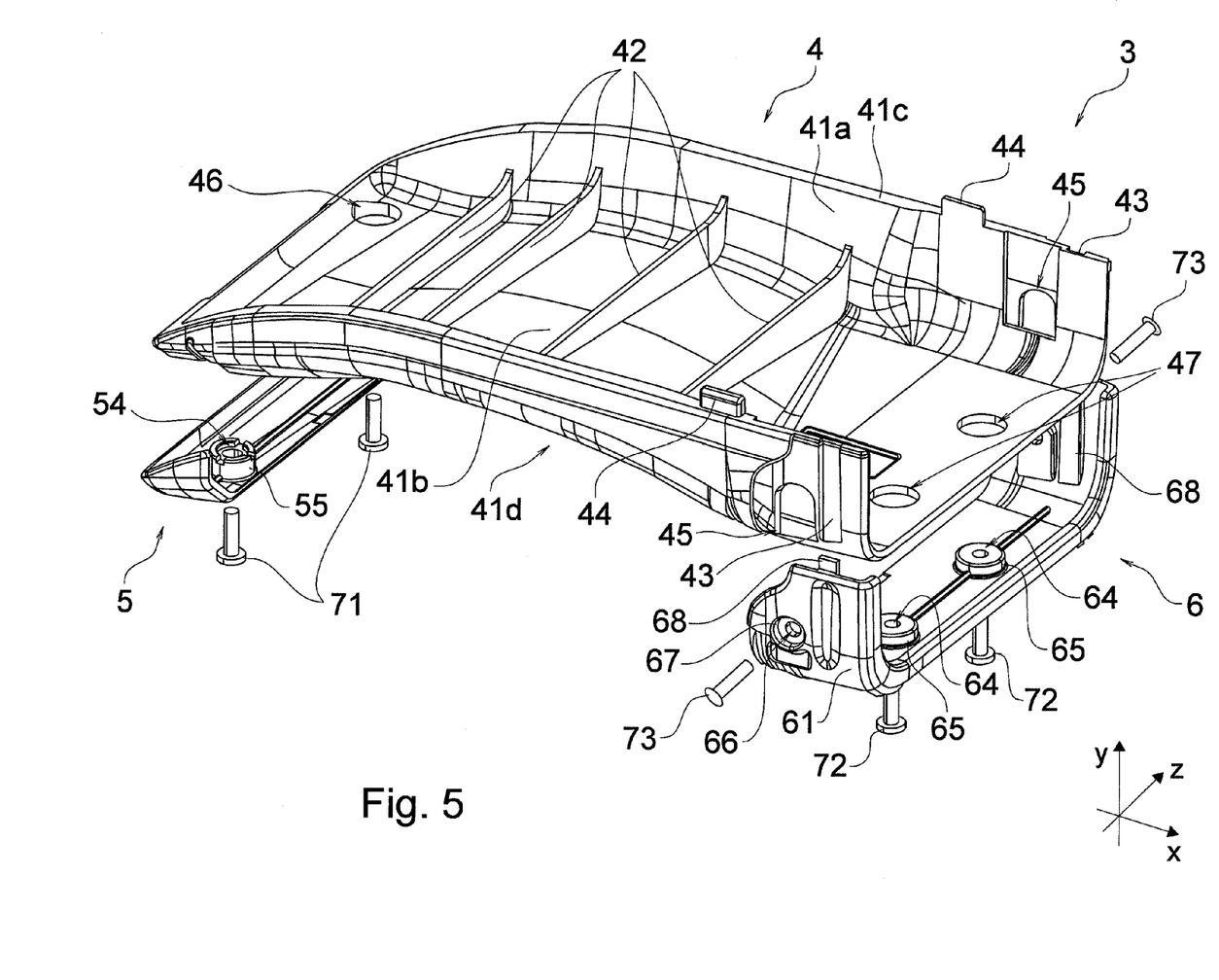
FIG. 5 is an exploded perspective view of a shoulder pad.

As shown in FIG. 5, the front support member 5 and the rear support member 6 support the pad main body 4 from the outside, which fixes the pad main body 4 to the main body casing 21.

More specifically, as shown in FIG. 5, the bosses 55 of the front support member 5 and the bosses 65 and 67 of the rear support member 6 are inserted into the openings 46, 47, and 45 of the pad part 41. Screws 71, 72, and 73 are inserted into the screw holes 54, 64, and 66 of the bosses 55, 65, and 67, respectively. These screws 71 to 73 are further inserted into screw holes (not shown) formed in the main body casing 21. This fixes the bosses 55, 65, and 67 so as to be in direct contact with bosses (not shown) formed on the main body casing 21.

At this point, at the front end of the pad part 41, the side walls 51 of the front support member 5 are in contact with the side walls 41a of the pad part 41, and the bottom wall 52 of the front support member 5 is in contact with the bottom wall 41b of the pad part 41. At the rear end of the pad part 41, the side walls 61 of the rear support member 6 are in contact with the side walls 41a of the pad part 41, and the bottom wall 62 of the rear support member 6 is in contact with the 51b of the pad part 41. The front wall 53 of the front support member 5 is in contact with the front end of the pad main body 4, and the rear wall 63 of the rear support member 6 is in contact with the rear end of the pad main body 4, and are disposed so as to cover the front and rear ends of the pad main body 4, respectively.

As discussed above, the front end of the pad main body 4 is sandwiched between the front support member 5 and the main body casing 21, and the rear end of the pad main body 4 is sandwiched between the rear support member 6 and the main body casing 21, which fixes the pad main body 4 to the main body casing 21.

The protrusions 68 of the rear support member 6 are disposed at positions where they fit into the grooves 43 in a state in which the rear support member 6 is supporting the pad main body 4. Also, the protrusions 68 are formed so that, in this state, the upper ends of the protrusions 68 protrude higher than the upper ends 41c. The upper ends of the protrusions 68 fit into recesses (not shown) provided in the main body casing 21, which positions the shoulder pad 3 with respect to the main body casing 21.

As shown in FIG. 6, the height of the ribs 42, that is, the distance H1 from the inner face of the bottom wall 41b to the upper ends of the ribs 42, is less than the distance H2 from the inner face of the bottom wall 41b to the bottom face of the main body casing 21. As a result, there is a gap between the bottom face of the main body casing 21 and the upper ends of the ribs 42. However, when an upward force is exerted on the pad main body 4, this force deforms the bottom wall 41b of the pad part 41, and the ribs 42 may touch the bottom face of the main body casing 21.

The effect of providing the ribs 42 is that in a state in which the pad main body 4 is fixed to the main body casing 21, when an upward force is exerted on the pad main body 4, the amount of deformation of the pad part 41 is limited. Also, the ribs 42 prevent the bottom face of the main body casing 21 from touching the bottom wall 41b of the pad part 41. As a result, the pad main body 4 functions as a cushion, which softens the impact to the camera main body 2 and to the user's shoulder. Limiting the amount of deformation of the pad part 41 in the lateral direction (the z axis direction) with the ribs 42 prevents the pad part 41 from bulging outside the side faces of the main body casing 21 due to deformation of the pad part 41.

The amount of deformation of the pad main body 4 in the forward and backward direction (the x axis direction) is limited by the front support member 5 and the rear support member 6.

Also, as shown in FIG. 6, a step part 24 is provided between the bottom face and each of the side faces of the main body casing 21. These step parts 24 are disposed so that the upper ends 41c of the pad part 41 fit into the step parts 24. The maximum width W1 of the pad part 41 at the upper ends 41c is set smaller than the maximum width W2 of the step parts 24. In other words, the thickness W3 of the side walls 41a of the pad part 41 is set to be no more than the width W4 of the step parts 24. In particular, the thickness W3 is preferably set to be smaller than the width W4. Consequently, the pad part 41 does not stick out beyond the main body casing 21. As a result, the user will not catch a finger or the like on the pad part 41 and cause the pad part 41 to be misaligned with respect to the main body casing 21.

Also, as shown in FIG. 6, a recess 25 is provided to each of the step parts 24. The recesses 25 are provided at locations where the protrusions 44 of the pad part 41 fit into the recesses 25 in a state in which the rear support member 6 is supporting the pad main body 4. The effect of inserting the protrusions 44 into the recesses 25 is that the amount of deformation of the pad part 41 in the z axis direction is limited. That is, when an upward force is exerted on the pad main body 4, the protrusions 44 inserted into the recesses 25 prevents the pad part 41 from moving out beyond the side faces of the main body casing 21 due to deformation of the pad part 41.

Figure 7:
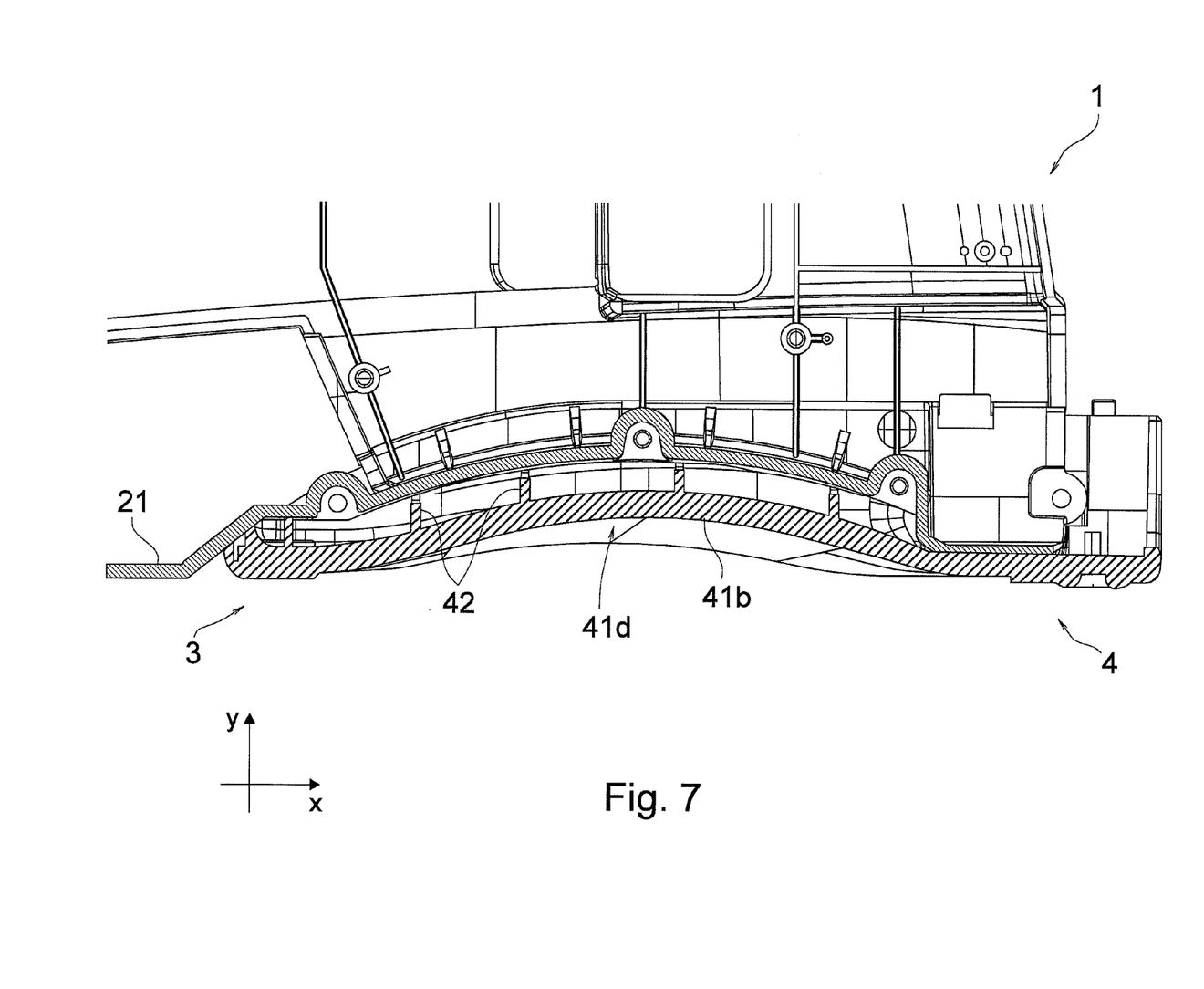
FIG. 7 is a cross section of the lower part of a video camera in the x-y plane.

As discussed above, the indentation 41d is provided to the outer face of the bottom wall 41b of the pad part 41 (FIG. 7). Also, as shown in FIG. 6, the entire outer face of the bottom wall 41b, including the indentation 41d, is formed at an angle so that the right side drops down farther than the left side. More specifically, the height of the step parts 24 is substantially the same on the left and right, and the height of the side walls 41a of the pad part 41 is greater on the right side wall 41a than on the left side wall 41a. The shape of the pad part 41 here is an example of a shape that conforms to the user's shoulder.

The shoulder pad 3 in this embodiment has a U-shaped pad part 41, and the ribs 42 are provided on the inside, so even though the interior of the pad part 41 is hollow, a good cushioning effect can still be achieved.

Also, with the shoulder pad 3, the resilient pad main body 4 is separated from the front support member 5 and rear support member 6 that fix the pad main body 4. Therefore, the pad main body 4, the front support member 5, the rear support member 6, and the other members can be formed with a standard injection molding. An advantage of this is that the yield is better in the manufacture of the various members. Also, because the pad main body 4, the front support member 5, and the rear support member 6 are hollow on the inside, less material is required, and this lowers the costs entailed in manufacture.

Furthermore, the pad main body 4, the front support member 5, the rear support member 6, and the other members are each formed from a single material. Accordingly, the different material can be easily separated by taking apart the shoulder pad 3. Thus, another advantage is that the shoulder pad 3 is easier to recycle.

I-2. Video Camera Features (1)

The pad main body 4 of the shoulder pad 3 includes the elastic pad part 41 comprising a first side wall 41a, a second side wall 41a provided to face the first side wall, and a bottom wall 41b provided between the side walls 41a to form a U shape along with the side walls 41a; and ribs 42 provided on the inside of the U shape of the pad part 41, from the first side wall 41a to the second side wall 41a.

Because the pad main body 4 includes the pad part 41 and the ribs 42, a good cushioning effect can be achieved. Therefore, the inside of the pad does not need to be filled, which reduces the manufacturing cost.

(2)

The ribs 42 are formed integrally with the pad part 41, so the entire pad main body 4 can be manufactured with a standard injection molding. Therefore, the manufacturing process is simpler and manufacturing costs can be further reduced.

(3)

The bottom wall 41b has a bottom face that is curved in the direction in which the side walls 41a protrudes from the bottom wall 41b of the pad part 41, namely, upward. Specifically, the bottom wall 41b has the indentation 41d on its bottom face. The user can fix the video camera 1 on his shoulder by lining his shoulder up with this indentation 41d.

Also, the bottom of the curve of the indentation 41d has a shape that traverses the bottom wall 41b in the z axis direction, which makes it easier for the user to fix the video camera 1 to his shoulder.

(4)

The ribs 42 are provided so that there is a gap between the camera main body 2 and the ribs 42 when the pad part 41 is fixed to the camera main body 2. Consequently, both good cushioning and good rigidity can be achieved.

(5)

The front support member 5 is disposed at the front end of the pad part 41, and the rear support member 6 at the rear end, in the forward and backward direction with respect to the user. That is, these support members are disposed on either side of the user's shoulder. Therefore, the support members do not hit the user's shoulder, which would cause the user pain or other discomfort.

Other Embodiments

Embodiments of the present invention are not limited to the one give above, and various modifications and changes are possible without departing from the gist of the invention. Also, the above embodiment is basically just a favorable example, and is not intended to limit the present invention, its applications, or the scope of these applications.

(A)

In the first embodiment, the ribs 42 were parallel to each other, but two or more of the ribs 42 may extend in mutually different directions.

Also, the direction in which the ribs 42 extend may be some direction other than the z axis direction.

(B)

In the first embodiment, the front support member 5 and the rear support member 6, which were separate members from the pad part 41, were given as examples of the fixing part to fix the pad part to the main body device, but the protrusions and/or bosses formed integrally with the pad part 41 may also function as a fixing part.

(C)

The materials of the various members included in the shoulder pad 3, such as the pad main body 4, the front support member 5, and the rear support member 6, and their methods of manufacture are not limited to what was discussed in the first embodiment above, and can be suitably modified.

(D)

In the first embodiment above, a shoulder pad was used given as one aspect, but the present invention can also be applied to various other pads that are used for other parts of the body.

(E)

In the first embodiment above, the camera main body 2 was given as an example of the main body device, but the pad of the present invention can also be applied to various other devices besides a video camera.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A pad, comprising:
an elastic pad part comprising a first side wall, a second side wall provided to face the first side wall, and a bottom wall provided between the side walls to form a U-shape along with the side walls, the bottom wall having a bottom face and an inner face opposite the bottom face, the inner face forming a part of the inside of the U-shape, the bottom face being curved inward in the direction in which the first and second side walls protrude from the bottom wall, the curve in the bottom face traversing the bottom wall in a first direction; and
at least one rib provided on the inside of the U shape of the pad part, from the first side wall to the second side wall in a direction parallel to the first direction.

2. The pad according to claim 1,
wherein the rib is formed integrally with the pad part.

3. A shoulder pad that is fixed to a main body device, comprising:
a elastic pad part comprising two side walls facing each other, and a bottom wall between the side walls forming a U-shape along with the side walls;
at least one rib provided on the inside of the U shape of the pad part, from one of the two side walls to the other; and
a fixing part that fixes the pad part to the main body device so that the inside of the U shape of the pad part faces the main body device.

4. The shoulder pad according to claim 3,
wherein there is a gap between the main body device and the rib when the pad part is fixed to the main body device.

5. The shoulder pad according to claim 3,
wherein the bottom wall has a bottom face that is curved inward in the direction in which the first and second side walls protrude from the bottom wall.

6. The shoulder pad according to claim 3,
wherein the main body device comprises a step part provided so that the side walls of the pad part fit when the pad part is fixed to the main body device, and
the thickness of the side walls of the pad part is set to be no more than the width of the step part.

7. A video camera, comprising:
a video camera main body; and
the shoulder pad according to claim 3.

8. The pad according to claim 3,
wherein the rib is formed integrally with the pad part.

9. The shoulder pad according to claim 8,
wherein there is a gap between the main body device and the rib when the pad part is fixed to the main body device.

10. The shoulder pad according to claim 8,
wherein the fixing part comprises a support member that supports the pad part at the outer face of the pad part so that the pad part will be fixed over the main body device.

11. The shoulder pad according to claim 10,
comprising as the support member:
a first support member disposed at a first end of the pad part in the forward and backward direction with respect to the user, and a second support member disposed at a second end.

12. The shoulder pad according to claim 8,
wherein the bottom wall has a bottom face that is curved inward in the direction in which the first and second side walls protrude from the bottom wall.

13. The shoulder pad according to claim 8,
wherein the main body device comprises a step part provided so that the side walls of the pad part fit when the pad part is fixed to the main body device, and
the thickness of the side walls of the pad part is set to be no more than the width of the step part.

14. A shoulder pad that is fixed to a main body device, comprising:
a elastic pad part comprising two side walls facing each other, and a bottom wall between the side walls forming a U-shape along with the side walls;
at least one rib on the inside of the U shape of the pad part, from one of the two side walls to the other; and
a fixing part that fixes the pad part to the main body device so that the inside of the U shape of the pad part is opposite the main body device;
wherein the fixing part comprises a support member that supports the pad part at the outer face of the pad part so that the pad part will be fixed over the main body device.

15. The shoulder pad according to claim 14,
comprising as the support member:
a first support member disposed at a first end of the pad part in the forward and backward direction with respect to the user, and a second support member disposed at a second end.

* * * * *